(12) United States Patent
Kim et al.

(10) Patent No.: US 10,149,302 B2
(45) Date of Patent: Dec. 4, 2018

(54) METHOD AND APPARATUS FOR CONTROLLING INTERFERENCE IN DEVICE-TO-DEVICE COMMUNICATION

(71) Applicants: Samsung Electronics Co., Ltd., Gyeonggi-do (KR); Research and Business Foundation Sungkyunkwan University, Gyeonggi-do (KR)

(72) Inventors: Sang-Hyo Kim, Seoul (KR); Hyun-Seok Ryu, Gyeonggi-do (KR); Dae-Gyun Kim, Gyeonggi-do (KR); Seung-Hoon Park, Seoul (KR); Jin Whan Kang, Gyeonggi-do (KR); Myung Hoon Koh, Gyeonggi-do (KR); Min Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/645,163

(22) Filed: Mar. 11, 2015

(65) Prior Publication Data

US 2015/0264695 A1 Sep. 17, 2015

(30) Foreign Application Priority Data

Mar. 11, 2014 (KR) ........................ 10-2014-0028290

(51) Int. Cl.
*H04W 72/00* (2009.01)
*H04W 72/08* (2009.01)
*H04W 8/00* (2009.01)

(52) U.S. Cl.
CPC ......... *H04W 72/082* (2013.01); *H04W 8/005* (2013.01)

(58) Field of Classification Search
CPC ..... H04W 24/00; H04W 84/18; H04W 28/04; H04W 12/06; H04L 47/10; H04L 29/06; G06K 19/0723; G06Q 10/10
See application file for complete search history.

(56) References Cited

U.S. PATENT DOCUMENTS

| | | | |
|---|---|---|---|
| 2007/0101339 A1* | 5/2007 | Shrum | H04L 47/805 718/104 |
| 2010/0240312 A1* | 9/2010 | Peng | H04W 72/02 455/63.1 |
| 2012/0085626 A1* | 4/2012 | Vlug | B65G 47/84 198/836.3 |
| 2012/0322368 A1 | 12/2012 | Desai et al. | |
| 2013/0010618 A1 | 1/2013 | Wang et al. | |
| 2013/0010661 A1 | 1/2013 | Esteves et al. | |
| 2013/0013779 A1 | 1/2013 | McGuire et al. | |
| 2013/0066966 A1* | 3/2013 | Patil | H04W 8/005 709/204 |
| 2013/0150058 A1* | 6/2013 | Lim | H04W 72/048 455/450 |

(Continued)

Primary Examiner — Jinsong Hu
Assistant Examiner — Alexander Yi

(57) ABSTRACT

Disclosed is a method for controlling interference for D2D communication. The method includes: identifying whether a position of a first user device belongs to a first area that satisfies a predetermined criterion; and if the position of the first user device is identified to belong to the first area, determining some resources constituting dedicated resources of the first area, among available resources of a signal for discovering a counterpart user device of D2D communication by the first user device, as resources of the signal.

20 Claims, 17 Drawing Sheets

(56) References Cited

U.S. PATENT DOCUMENTS

| | | | | |
|---|---|---|---|---|
| 2013/0272262 A1* | 10/2013 | Li | ............... | H04W 28/02 |
| | | | | 370/330 |
| 2014/0226504 A1* | 8/2014 | Tavildar | ............... | H04W 72/082 |
| | | | | 370/252 |
| 2015/0148965 A1* | 5/2015 | Lemire | ............... | G05B 15/02 |
| | | | | 700/276 |
| 2015/0358899 A1* | 12/2015 | Ko | ............... | H04W 48/16 |
| | | | | 370/252 |

* cited by examiner

METHOD AND APPARATUS FOR CONTROLLING INTERFERENCE IN DEVICE-TO-DEVICE COMMUNICATION

CROSS-REFERENCE TO RELATED APPLICATION AND CLAIM OF PRIORITY

The present application is related to and claims the priority under 35 U.S.C. § 119(a) to Korean Application Serial No. 10-2014-0028290, which was filed in the Korean Intellectual Property Office on Mar. 11, 2014, the entire content of which is hereby incorporated by reference.

TECHNICAL FIELD

The present disclosure relates to a pre-$5^{th}$-Generation (5G) or 5G communication system to be provided for supporting higher data rates Beyond $4^{th}$-Generation (4G) communication system such as Long Term Evolution (LTE), specifically a method and an apparatus for controlling interference in device-to-device communication.

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

BACKGROUND

In typical mobile communication systems, user devices in a limited area share limited resources, such as, time, frequency, or the like, for use. If a large number of user devices exist in a specific area, the communication resources allotted to each user device can be decreased. In such an environment, most user devices may not have satisfactory communication services provided. The typical mobile communication systems have adopted methods of using base stations, such as small cells, or heterogeneous networks, in order to cope with the problem of a high density of user devices. More specifically, small base stations or repeaters are installed in an area (hereinafter, referred to as a "dense area"), such as shopping malls, airports, or the like, where many people gather, to deal with heavy traffic, and Wi-Fi access points (AP) are installed to distribute traffic through the heterogeneous network. In a specific area where people gather in specific season, for example, in a downtown area in Christmas season, mobile base stations are disposed to be prepared for a heavy increase in traffic.

Compared to the mobile communication systems above, in device-to-device (D2D) communication supported by 5G communication systems that is one of the distributed communication systems in which communication is made without utilizing infrastructure, such as base stations, or Wi-Fi APs, the user device should perform most operations for communication by itself. Therefore, the methods described above to deal with heavy traffic in a dense area in the typical mobile communication systems are hardly applied to the D2D communication. Thus, a specific method for controlling interference of the dense area in the distributed communication environment is required.

SUMMARY

To address the above-discussed deficiencies, it is a primary object to provide a method and an apparatus for managing resources in a dense area and controlling interference in a distributed communication environment such as D2D communication.

The present disclosure provides a method and an apparatus by which each user device for D2D communication determines the dense area by itself, and if the entry of the user device into the dense area is identified, interference is controlled using resource partition.

In accordance with an aspect of the present disclosure, a method for controlling interference for D2D communication includes: identifying whether the position of the first user device belongs to the first area that satisfies a predetermined criterion; and if the position of the first user device is identified as belonging to the first area, determining some of the resources constituting dedicated resources of the first area, among available resources of a signal for discovering a counterpart user device of D2D communication by the first user device, as resources of the signal.

In accordance with another aspect of the present disclosure, a user device for controlling interference for D2D communication includes: a controller that identifies whether the position of the user device belongs to the first area that satisfies a predetermined criterion, and if the position of the user device is identified as belonging to the first area, determines some of the resources constituting dedicated resources of the first area, among available resources of a signal for discovering a counterpart user device of D2D communication, as resources of the signal.

According to embodiments of the present disclosure, the user device for D2D communication determines whether its own position belongs to the dense area by itself, and if the user device is located in the dense area, resources for transmitting a discovery signal are selected from among dedicated resources of the dense area in available resources, so interference created by other devices is reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
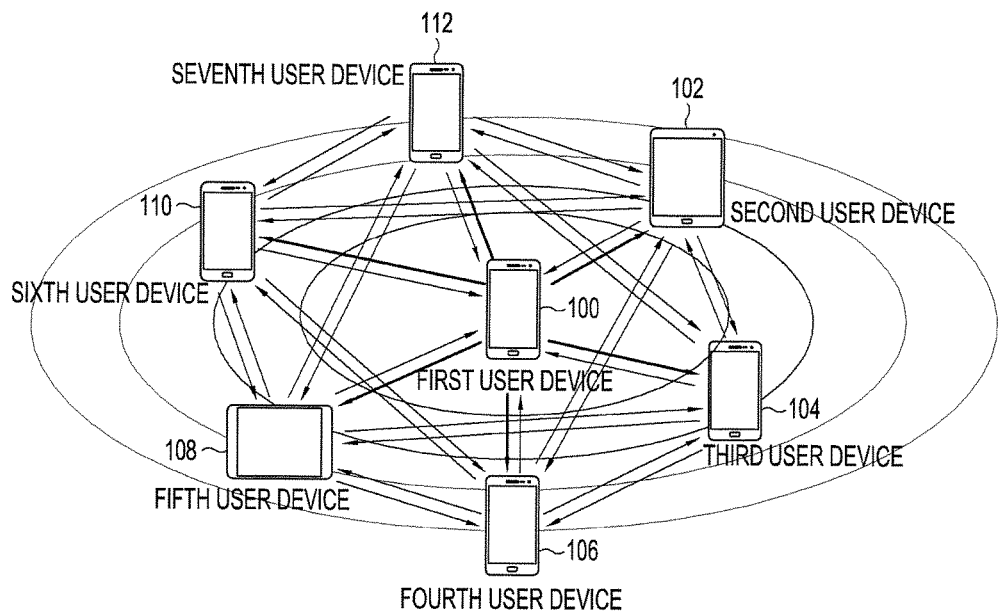
FIG. 1A illustrates an example of a mesh network to describe a general device discovery process according to various embodiments of the present disclosure.

FIGS. 1A through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, the operation of a preferred embodiment of the present disclosure will be described in detail with reference to the accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms varies according to the intention of a user or operator, convention, or the like. Therefore, the definitions of the terms should be determined based on the contents throughout the specification.

In order to perform typical device to device (D2D) communication, a device discovery process, by which each user device discovers a distance enabling D2D communication and other user devices for D2D communication, is performed. The device discovery process is a prerequisite to an actual communication process of configuring a link between the user devices for D2D communication and transmitting or receiving data through the link.

FIG. 1A illustrates an example of a mesh network to describe a general device discovery process according to various embodiments of the present disclosure.

Referring to FIG. 1A, seven user devices, such as the first user device 100 to the seventh user device 112, perform the device discovery process.

Figure 1B:
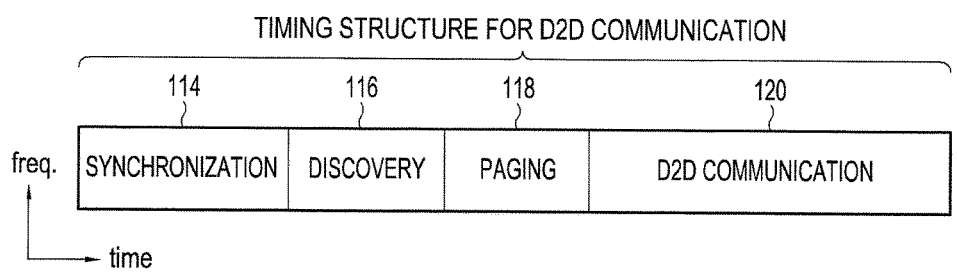
FIG. 1B illustrates a typical timing structure for device to device (D2D) communication according to various embodiments of the present disclosure.

In addition, FIG. 1B illustrates a typical timing structure for D2D communication according to various embodiments of the present disclosure.

Referring to FIG. 1B, time sections for D2D communication includes a synchronizing section 114 in which one user device is synchronized with the other user device, a discovery section 116 in which one user device performs a process of discovering the other user device for D2D communication, a paging section 118 for transmitting a paging signal, and a D2D communication section 120 for transmitting and receiving data for D2D communication between one user device and the other user device. The sections except for the discovery section 116 are the same as those of typical D2D communication, so the detailed description thereof will be omitted here.

More specifically, in the discovery section 116, the first user device 100 to the seventh user device 112 broadcast information including a network address, which is necessary for device discovery, to be received by nearby user devices and decodes signals broadcast by other user devices to identify discovery information of the nearby user devices.

Figure 2:
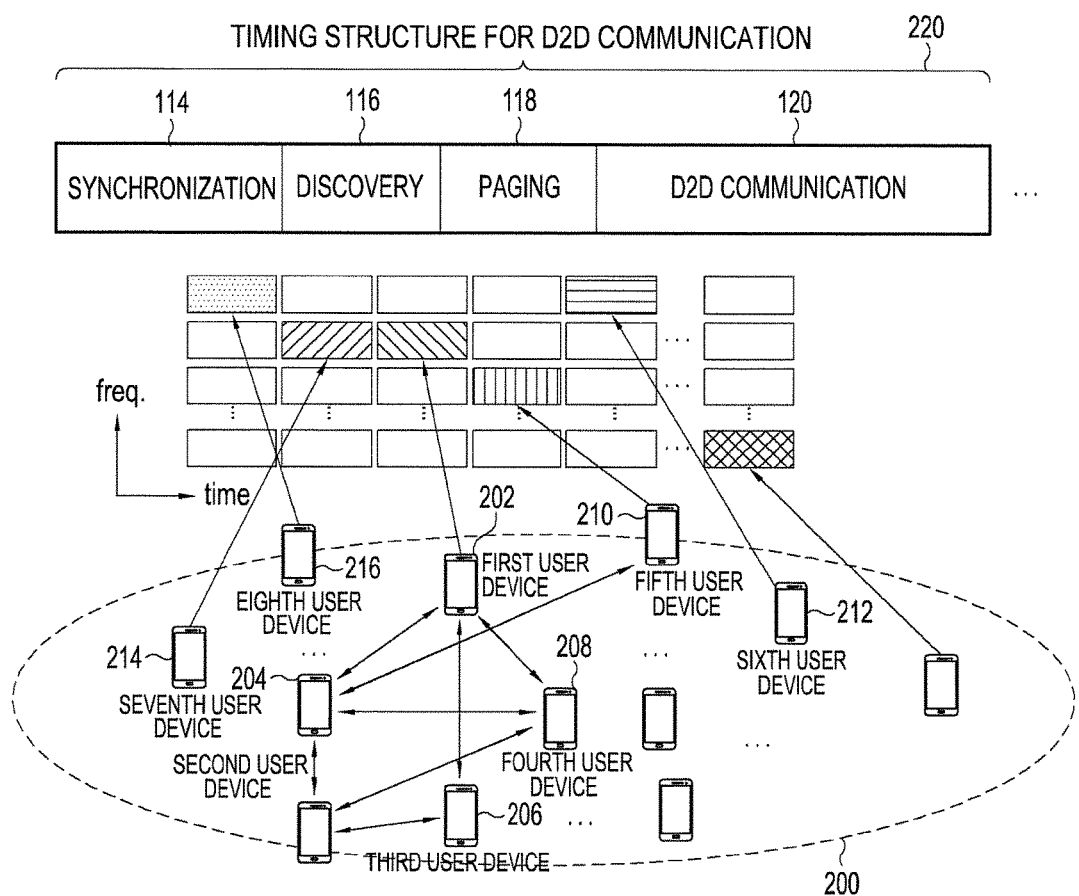
FIG. 2 illustrates a typical resource allotment structure for D2D communication according to various embodiments of the present disclosure.

FIG. 2 illustrates a typical resource allotment structure for D2D communication according to various embodiments of the present disclosure.

Referring to FIG. 2, for example, the first user device 202 performs D2D communication. In certain embodiments, the first user device 202 performs a device discovery process for identifying the distance 200, in which D2D communication is available, and information on the nearby user devices, for example, the second user device 206, the third user device 206, and the fourth user device 208, which are located within the available distance for D2D communication. The timing structure 202 for D2D communication is the same as that of FIG. 1B, so the detailed description thereof will be omitted. Communication resources (hereinafter, referred to as "entire discovery resources"), which are comprised of separate times and frequencies, are allotted to the discovery section 116 of the timing structure 220. Since the entire discovery resources allotted to the discovery section 116 are shared by all of the user devices that are located in a predetermined coverage, the device discovery process is based on a multiple-access communication method. The discovery signal transmitted by a main user device for discovering a counterpart user device for D2D communication is shorter than a normal message used in typical communications. The user devices located in the coverage broadcast the discovery signal using some of the entire discovery resources allotted to the discovery section 116. Referring to FIG. 2, with regard to some of the entire discovery resources, for example, the discovery signal is broadcast using one of discovery resource blocks (DRB) that are comprised of partial time and partial frequency, which have the same time interval, among times and frequencies corresponding to the entire discovery resources allotted to the discovery section 116. In FIG. 2, dotted or hatched blocks denote DRBs allotted to the user device. Since D2D communication does not consider infrastructure, such as base stations for allotting exclusive resources to the user devices, each user device should select the DRB for transmitting the discovery signal by itself.

The device discovery process is performed in the dense area. In certain embodiments, the main user device should share the DRBs of the entire discovery resources allotted to the discovery section 116 with other user devices, so the main user device is likely to select the same DRB as that of other user devices. Moreover, the user device located in the dense area is more influenced by interference, compared to the user device (hereinafter, referred to as an "external user device") that is located outside the dense area.

Hereinafter, the embodiment of the present disclosure provides a discovery environment self-determination method by which the user device for D2D communication determines whether its own position belongs to the dense area by itself, in order to improve performance of the device discovery process for D2D communication. The various embodiments of the present disclosure provide a method by which, if the user device determines that its own position belongs to the dense area, the user device allots dedicated resources to the dense area using resource partition, power control, or discovery period control, in order to reduce interference created in the device discovery process. The various embodiments of the present disclosure are applied to the distributed communications set forth above, and D2D communication that is one of the distributed communications will be described in relation to the various embodiments of the present disclosure.

Discovery Environment Self-Determination Method

According to various embodiments of the present disclosure, the user device for D2D communication identifies whether its own position belongs to the dense area using a statistical analysis method of reception power. According to the various embodiments of the present disclosure, in a statistical analysis method of reception power, power of the discovery signal received by the user device is turned into data to be thereby analyzed in a statistical method, regardless of the content of information included in the received discovery signal. The discovery signal, according to various embodiments of the present disclosure, does not include any information on the device discovery environment. Thus, overhead is not generated as well.

Hereinafter, the dense area is defined as follows in the various embodiments of the present disclosure. More specifically, in terms of mathematics, the dense area is defined as an environment in which at least a predetermined number of user devices exist in a specific area (such as at least "Y" nearby user devices exist within a distance of "X" meters from the user device). In certain embodiments, if the user devices are uniformly distributed within the distance of "X" meters, "X" and "Y" are configured as the numbers favorable to measurement and calculation. For example, "X" and "Y" are configured as "tens of meters" and "tens of devices," respectively. The mathematical definition about the dense area is used for a criterion by which the user device determines whether its own position belongs to the dense area. The user device, according to various embodiments of the present disclosure, determines a distance to the other user device located in the dense area by measuring power of the reception signal. The shorter the physical distance is between the user devices, the better the visibility that is obtained. A pair of user devices that have a short physical distance between them is more likely to secure a line of sight. Accordingly, if the user device exists in the dense area, a distance between user devices in the dense area is relatively short. Thus, the user device in the dense area is likely to receive a plurality of discovery signals having relatively high power. According to the various embodiments of the present disclosure, the user device identifies a power level of the DRB allotted to the discovery signal that is received from the nearby user device. If the result of the identification satisfies a criterion that the number of DRBs having power equal to or more than a specific level exceeds a predetermined value (hereinafter, referred to as a "criterion for dense area determination"), the user device determines that its own position belongs to the dense area.

More specifically, the user devices, according to certain embodiments of the present disclosure, defines "a specific power level" and "a predetermined number" of DRBs having power equal to or more than the specific power level, which are factors of the criterion for dense area determination, as follows.

According to the various embodiments of the present disclosure, a power noise (PN) level is measured in order to determine the "specific power level" that is a criterion of a power level of the discovery signal received by the user device. For example, a thermal noise power level is easily obtained in most communication systems, and usually, is measured in the external frequency band other than the normal frequency band. If the thermal noise power level is not available, the lowest value among power levels of the DRBs measured in the received discovery signals is regarded as the thermal noise power. In certain embodiments, an average value of the DRBs of a specific percentage, which have the lowest power value, is used for the thermal noise power value. The thermal noise power value, such as the power level, is given in a decibel (dB) unit.

The number of DRBs having power equal to or more than "PN+$\alpha$" dB, such as the criterion for dense area determination that is determined based on the configured thermal power noise (PN), is measured from among the DRBs of the received discovery signals. If the measured number of DRBs exceeds a predetermined value $\lambda$, the user device determines that its own position belongs to the dense area. The criterion for dense area determination is based on the mathematical definition of the dense area. Based on the mathematical definition of the dense area where "Y" user devices exist within a radius of "X," the thermal-signal to noise ratio (SNR) $\alpha$ is determined to reflect the radius of "X", considering a path loss model. The predetermined value $\lambda$ is configured in consideration of "Y." The user device identifies that at least $\lambda$ nearby user devices have transmitted signals more than SNR $\alpha$ through the operation above.

Figure 3:
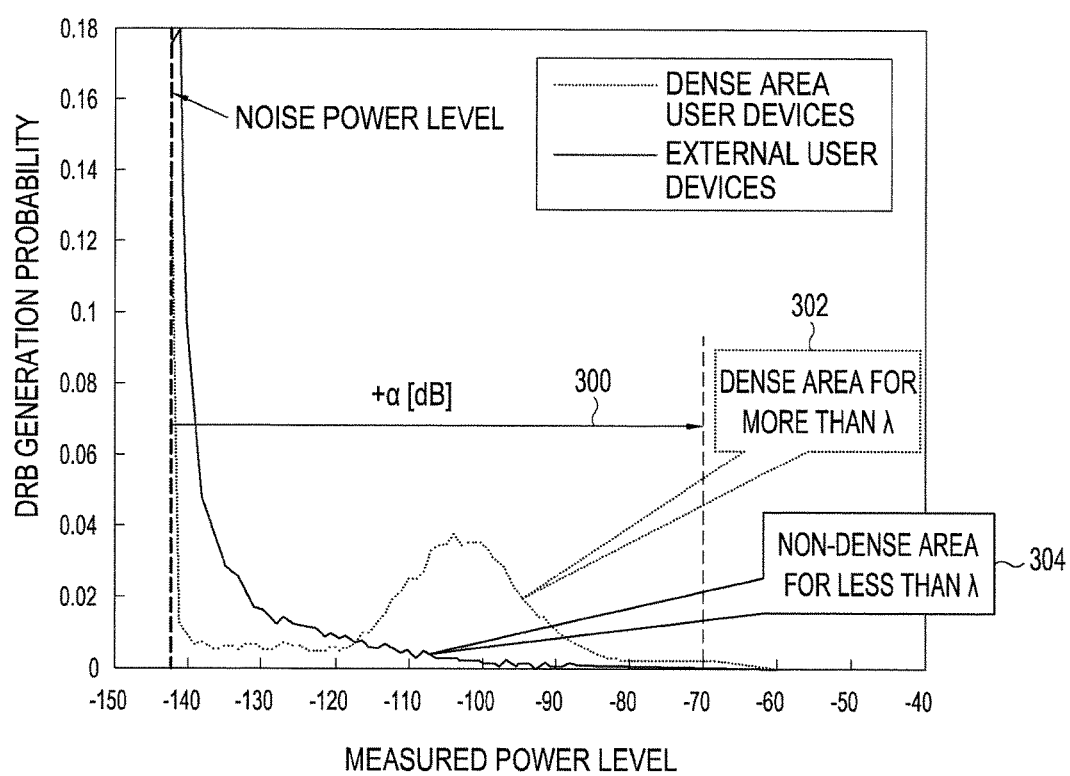
FIG. 3 illustrates an example in which a user device determines whether the user device exists within a dense area according to a dense area determination criterion according to various embodiments of the present disclosure.

FIG. 3 illustrates an example of operation in which a user device determines whether its own position belongs to the dense area according to the criterion for dense area determination according to various embodiments of the present disclosure.

Referring to FIG. 3, it is determined that the user device is located in the dense area in the case of a dotted line 302 in which the number of DRBs having signals equal to or more than SNR $\alpha$ (see 300) exceeds the predetermined value $\lambda$, provided that SNR $\alpha$ is configured, for example, to be −70 dB. If the number of DRBs having signals equal to or more than SNR $\alpha$ does not exceed the predetermined value $\lambda$ (see 304), the user device is determined to be located outside the dense area.

As described above, each user device determines whether its own position belongs to the dense area, based on the criterion for dense area determination defined by $\alpha$ and $\lambda$. In certain embodiments, the more accurate parameters, such as $\alpha$ and $\lambda$, which constitute the criterion for dense area determination, are, the more accurate the determination for the dense area are. To this end, the parameters of $\alpha$ and $\lambda$ are configured as default values by manufacturers or communication service providers in a static method in which the user device uses the parameters of the configured default values. In certain embodiments, in a learning method, the user device accumulates previously received discovery signals and previous results of dense area determination and selects the parameters for use based on the accumulation.

Method for Reducing Interference in Device Discovery Process

Meanwhile, the performance of the user device located in the dense area is degraded due to interference of discovery signals of other user devices in the same dense area. Therefore, the embodiment of the present disclosure provides a resource partitioning method for regulating interference by signals of other user devices in the dense area if the user device in the same dense area performs the device discovery process.

Figure 4:
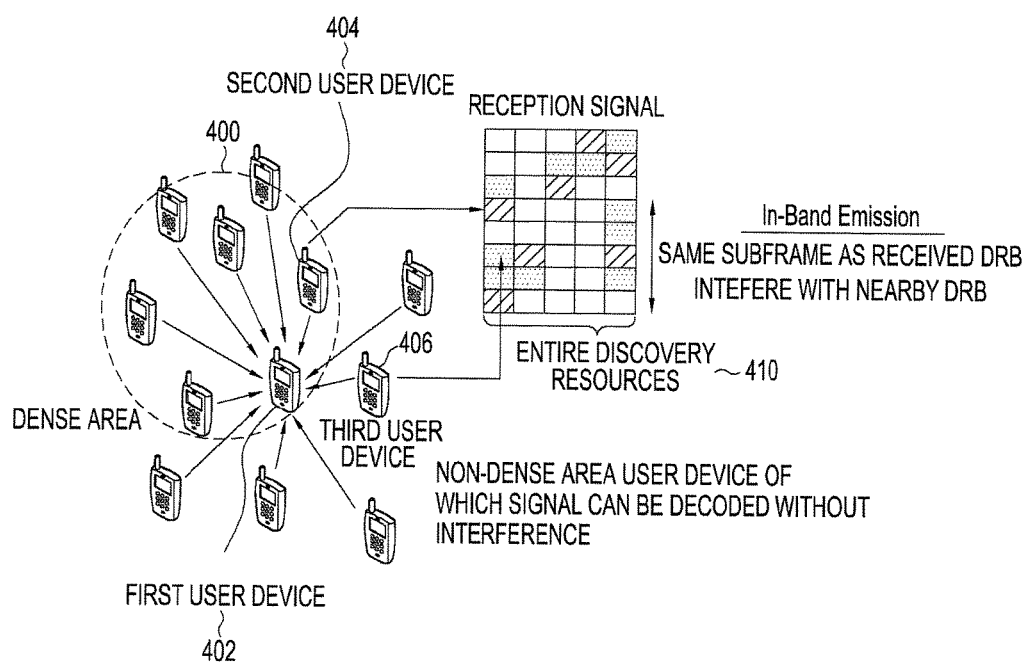
FIG. 4 illustrates interference with a user device located in a dense area by other user devices in the same dense area according to various embodiments of the present disclosure.

FIG. 4 illustrates interference with a user device located in a dense area by other user devices in the same dense area according to various embodiments of the present disclosure.

Referring to FIG. 4, for example, the first user device 402 moves to the dense area. The first user device 402 has identified that its own position belongs to the dense area 400 according to the criterion for dense area determination set forth above. As shown in FIG. 4, distances between the user devices in the same dense area are quite short, such as less than tens of meters, and discovery signals of the user devices exhibit relatively low path loss. Therefore, the first user device 402 receives discovery signals of enough power to be decoded from other user devices in the same dense area. In addition to the discovery signals of other user devices, the first user device 402 receives in-band emission (IBE) interference of high power due to the discovery signals. In certain embodiments, the IBE is a natural phenomenon by which power of discovery signals transmitted through a specific subframe (time) and a specific band (frequency) interferes with other bands of the same subframe in part, which results from signal transmission. For example, if the second user device 404 and the third user device 406 select the DRB corresponding to a frequency band different from that of the first user device 402 in the same subframe, the first user device 402 detects the IBE interference due to the discovery signals transmitted by the second user device 404 and the third user device 406. If the user devices in the same dense area select the DRBs for the discovery signals (such as sub-blocks dotted or hatched in the entire discovery resources 410) from among all of the subframes constituting the entire discovery resources 410, the selected DRBs acts as high IBE interference. Thus, as shown in FIG. 4, the discovery signal transmitted by the user device, such as the second user device 404, which is located in a distance in which the second user device be identified in the case of no interference, is not likely to be decoded due to the IBE interference from other user devices in the dense area 400.

Accordingly, the present disclosure provides a resource partitioning method by which some of the entire available resources (hereinafter, referred to as "entire discovery resources") allotted for the discovery signals of the user devices are used as resources (hereinafter, referred to as "dense area discovery resources") for the discovery signals by the user devices located in the dense area. The resource partitioning method is divided into a type of a subframe unit and a type of a subcarrier unit according to embodiments.

Figure 5A:
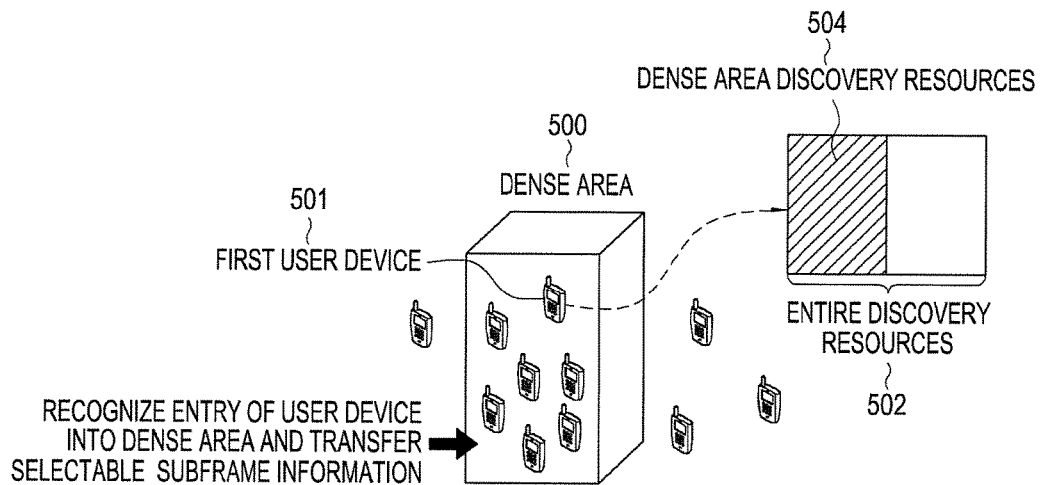
FIG. 5a illustrates a resource partitioning method by a sub-frame unit according to various embodiments of the present disclosure.

FIG. 5A illustrates a resource partitioning method by a sub-frame unit according to certain embodiments of the present disclosure. The embodiment of FIG. 5A provides a method by which the user devices in the same dense area select the DRBs for discovery signals from among some of the subframes constituting the entire discovery resources, and transmit the discovery signals using the selected DRBs. In FIG. 5A, the first user device 501 has identified that its own position belongs to the dense area 500 based on the criterion for dense area determination set forth above. In certain embodiments of the present disclosure, the first user device 501 identifies whether its own position belongs to the dense area 500 using the nearby user devices, if nearby user devices are around the first user device 501 in the dense area 500. Furthermore, the first user device 501 includes information stating that the current dense area 500 is the dense area defined in the present disclosure and discovery signals received from the nearby user devices during the reception of the discovery signals. The detailed description thereof will be described with reference to FIG. 7. The first user device 501 obtains information on resources available for discovery signals in the dense area 500, such as the information on dense area discovery resources. The information on dense area discovery resources is obtained from the nearby user devices or by analyzing the discovery signals of other user devices located in the dense area 500, according to various embodiments. The obtaining operation will be described in detail later.

Referring to FIG. 5A, the discovery resources 504 for the dense area 500 is defined as a partial area 504 corresponding to some of the subframes constituting the entire discovery resources 502. Accordingly, if the first user device 501 identifies the position of the dense area discovery resources 504, the first user device 501 selects the DRB for transmitting its own discovery signal from among the dense area discovery resources 504 and transmits the discovery signal using the selected DRB.

Figure 5B:
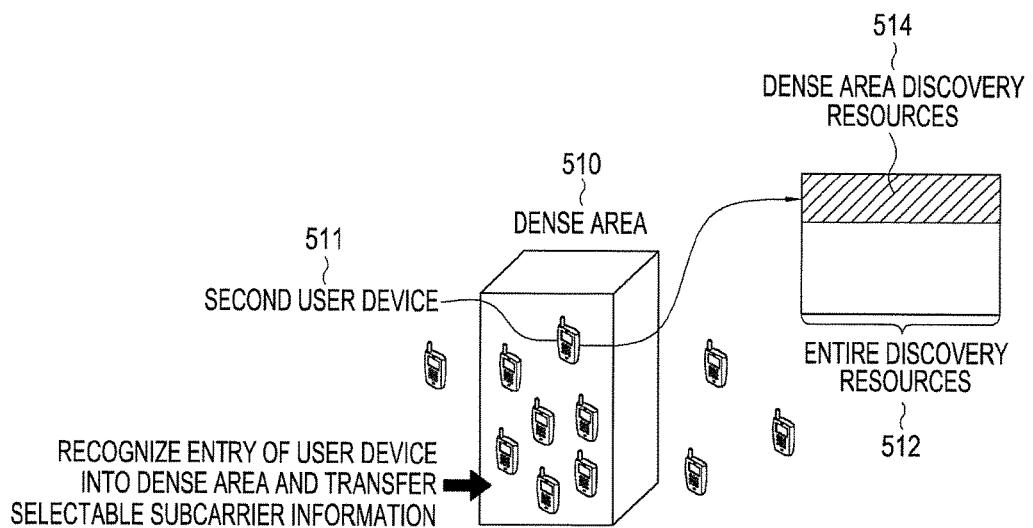
FIG. 5b illustrates a resource partitioning method by a subcarrier unit according to various embodiments of the present disclosure.

FIG. 5B is a diagram to describe a resource partitioning method by a subcarrier unit according to various embodiments of the present disclosure.

In FIG. 5B, the second user device 511 has identified that its own position belongs to the dense area 510 based on the criterion for dense area determination set forth above. According to certain embodiments of the present disclosure, the second user device 511 identifies whether its own position belongs to the dense area 510 using the nearby user devices.

The second user device 511 obtains information on resources available for discovery signals in the dense area 510, such as information on dense area discovery resources. The information on dense area discovery resources is obtained from the nearby user devices or by analyzing the discovery signals of other user devices located in the dense area 510, according to certain embodiments. The obtaining operation will be described in detail later.

Referring to FIG. 5B, the discovery resources 514 for the dense area 510 is defined as a partial area 514 corresponding to some of the subcarriers constituting the entire discovery resources 502. If the second user device 511 identifies the position of the dense area discovery resources 514, the second user device 511 selects the DRB for transmitting its own discovery signal from among the dense area discovery resources 514 and transmits the discovery signal using the selected DRB.

According to various embodiments of the present disclosure, it is considered to partition the entire discovery resources into dense area discovery resources corresponding to some of the subframes and some of the subcarriers.

According to various embodiments of the present disclosure, there is no limit to the resource area where the user device (hereinafter, referred to as an "external user device"), located outside the dense area (hereinafter, referred to as a "non-dense area"), selects the DRB for the discovery signal. The external user device selects the DRB from among the entire discovery resources and transmits the discovery signal using the same. According to certain embodiments, the external user device selects the DRB for the discovery signal from among the remaining resources except for the dense area discovery resources in the entire discovery resources. If the external user device selects the DRB for the discovery signal from among the remaining resources except for the dense area discovery resources, the discovery signal of the external user device has a relatively high signal-to-interference-to-noise ratio (SINR). Because the discovery signal of the external user device is less vulnerable to interference due to transmission of the discovery signals by the user devices located in the dense area, the possibility of discovery is increased.

In certain embodiments of the present disclosure, the selectable subframe area or subcarrier area is selected to be different by each dense area, in order to obtain the diversity effect due to the resource partition described above.

Figure 6A:
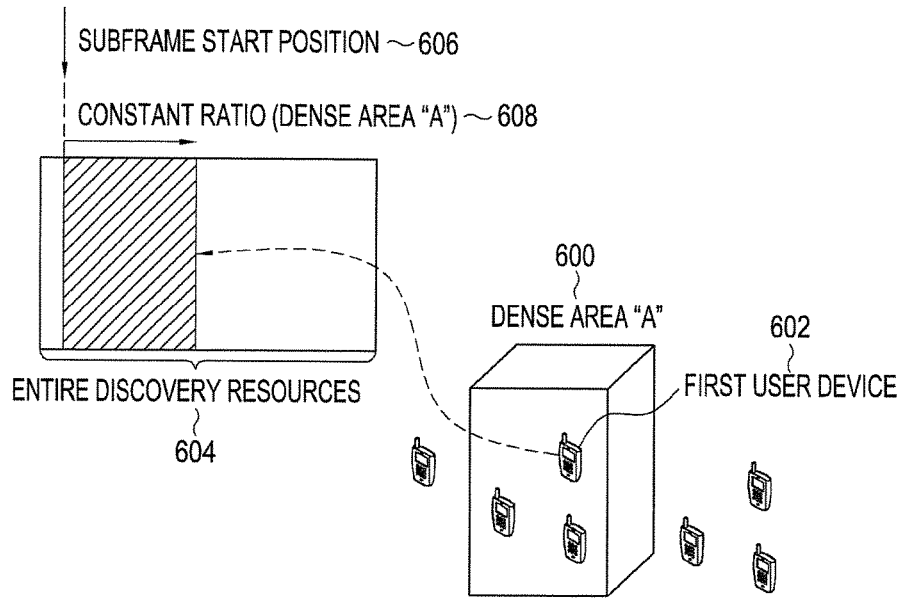
FIGS. 6A and 6B illustrate an example of a random resource area selection method by which dense area discovery resources are selected to be different in each dense area according to various embodiments of the present disclosure.
Figure 6B:
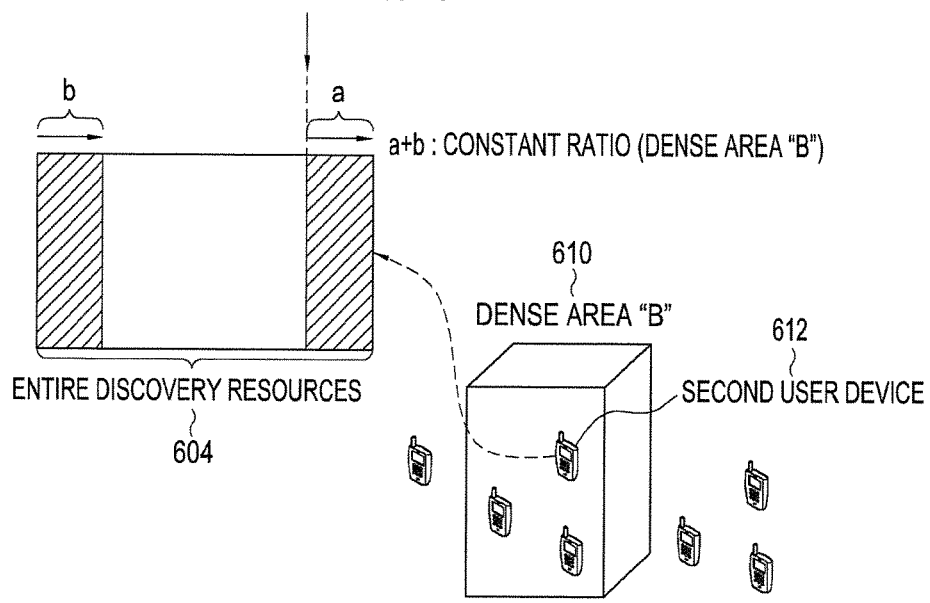

FIGS. 6A and 6B illustrate an example of a random resource area selection method by which dense area discovery resources are selected to be different by each dense area according to various embodiments of the present disclosure. In certain embodiments, a ratio of dense area discovery resources that is selected from the entire discovery resources in each dense area, such as a dense area A 600 and a dense area B 610 is predetermined. The ratio of dense area discovery resources is configured to be the same for each dense area. In certain embodiments, the ratio of dense area discovery resources is configured to be different in consideration of characteristics of each dense area such as the number of user devices in the dense area, a physical range of the dense area, or the like. For convenience of explanation, the ratios of dense area discovery resources in the dense area A 600 and the dense area B 610 are the same. In certain embodiments, the resource partition of each dense area is randomly determined based on the ratio. Shown in FIG. 6A, a start position 606 of subframes constituting the dense area discovery resources for the dense area A 600 is randomly determined in each dense area according to the various embodiments. The resources corresponding to the subframes of a determined ratio 608 from the start position 606 are selected from the entire discovery resources 604. The entire discovery resources are limited to a predetermined time area and a predetermined frequency area. In certain embodiments, the horizontal axis of the entire discovery resources 604 corresponds to a time area and the vertical axis corresponds to a frequency area. In FIG. 6B, a start position 614 of the subframes constituting the discovery resources for the dense area "B" 610 is configured, for example, as the position spaced a ratio of "a" from the end of the time area constituting the entire discovery resources 604. In certain embodiments, partial subframes corresponding to the ratio of "a" from the subframe start position 614 and partial subframes corresponding to the ratio of "b" from a start position of the subframes corresponding to the entire discovery resources 604 are selected as the resources corresponding to the ratio of "a+b" of the discovery resources for the dense area "B" 610. Likewise, each dense area independently selects available resource areas. According to the various embodiments of the present disclosure, the user device obtains information on the subframe start position of the dense area and the ratio of the subframes to the entire subframes, such as dense area discovery-related information, and selects the corresponding resources. In FIGS. 6A and 6B, the user device located in the dense area obtains the dense area discovery resources by a subframe unit. According to certain embodiments, the user device located in the dense area obtains the dense area discovery resources by a subcarrier unit or by a combination of a subframes unit and a subcarrier unit. The resource portioning method according to various embodiments of the present disclosure will be described in detail with reference to FIGS. 10A to 10C.

Figure 7:
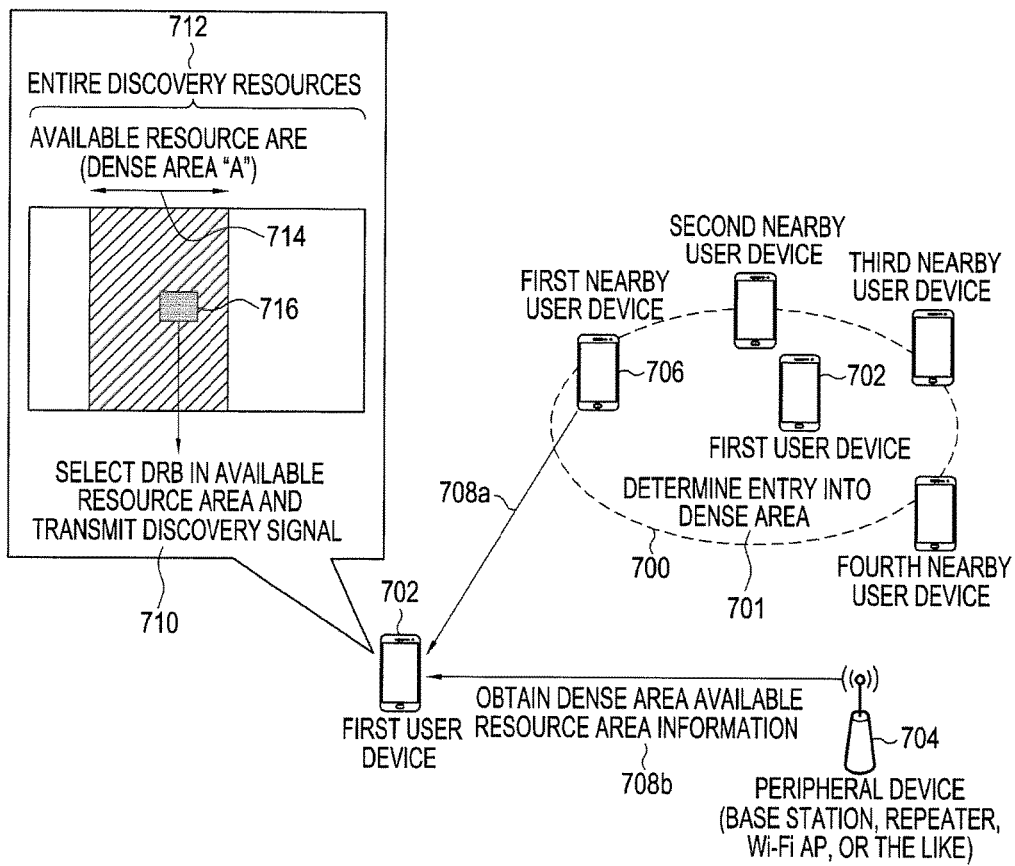
FIG. 7 illustrates overall operations of a resource partitioning method according to various embodiments of the present disclosure.

FIG. 7 illustrates a diagram to describe overall operations of a resource partitioning method according to certain embodiments of the present disclosure.

In FIG. 7, the first user device 702 moves to a dense area 700. In operation 701, the first user device 702 identifies whether its own position belongs to the dense area 700. According to certain embodiments, the first user device 702 identifies whether the criterion for dense area determination set forth above is satisfied or obtains information on whether the first user device 702 is located in the dense area 700 from peripheral devices or nearby user devices (see 708a). In certain embodiments, the peripheral devices are base stations, repeaters, Wi-Fi APs, radio frequency identification (RFID) units, infrared sensors, or the like. The peripheral device 704 for providing information on the dense area 700 is installed. In certain embodiments, the user device entering the dense area 700, such as the first user device 702, receives the information on the dense area 700 (see 708b) transmitted by the peripheral device 704, to determine whether the first user device 702 has entered the dense area. In certain embodiments, the first user device 702 identifies the dense area entry information included in the discovery signal that is periodically transmitted by the nearby user device, such as the first nearby user device 706 that recognizes the dense area 700 (see 708a), to determine the entry of the first user device into the dense area.

For example, if the first user device 702 recognizes that its own position belongs to the dense area 700, the first user device 702 obtains information on the discovery resources for the dense area 700 through one of the operation 708a or 708b, such as through the first nearby user device 706 or the peripheral device 704. In certain embodiments, the information on the dense area discovery resources is expressed as a start position of subframes of the discovery resources for the dense area 700 in the entire discovery resources 712 and a ratio of the discovery resources for dense area 700 to the entire discovery resources 712. The start position of the subframes is expressed as a subcarrier position, or a combination of a subframe position and a subcarrier position according to another embodiment of the present disclosure.

The information on the discovery resources for the dense area 700 is obtained by receiving the information from the nearby user device (such as see 704 of FIG. 7) or by analyzing the discovery signal of the nearby user device. If a multitude of user devices in a building where many people gather in a dense area 700, such as a shopping mall, an airport, an office, or the like such a building is regarded as a permanent dense area. In order to effectively deal with traffic between the user devices in the permanent dense area in the typical mobile communication system, peripheral devices, such as repeaters, Wi-Fi APs, or the like, are separately installed in the building. Spatial characteristics of the building facilitate installation of various communication auxiliary devices, such as RFID units, infrared sensors, or the like. The infrastructure for communication between the user devices is well established in various ways.

Figure 8:
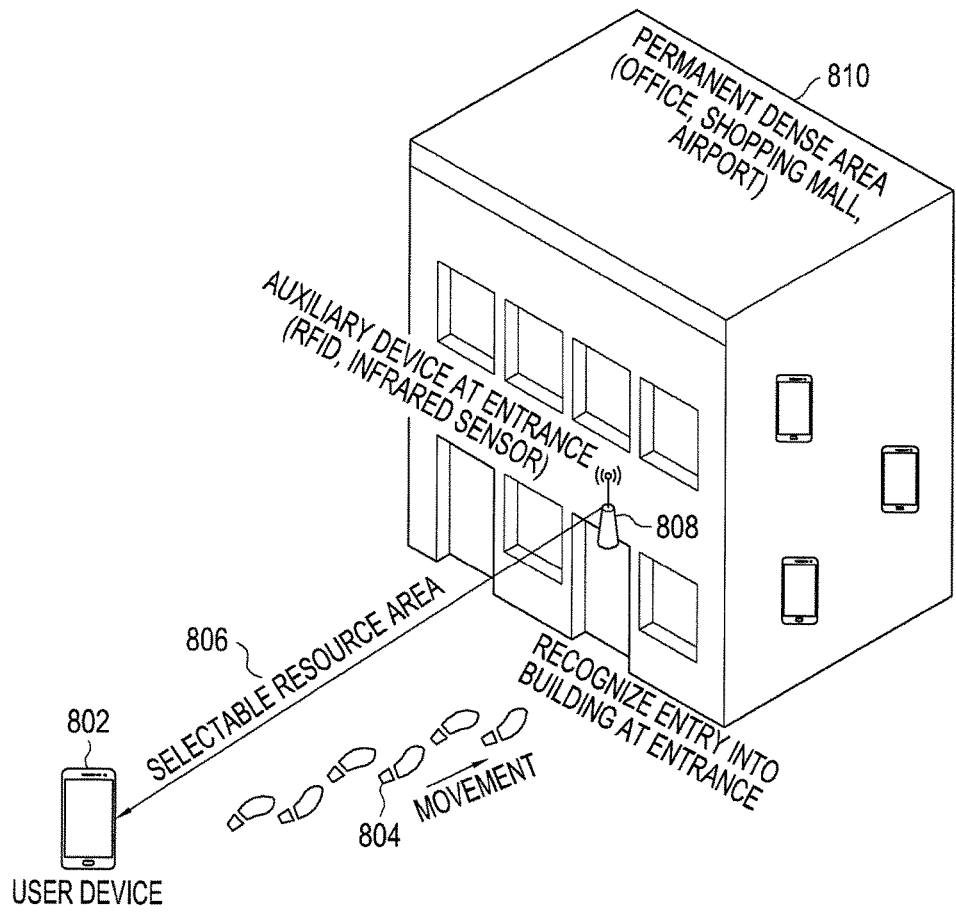
FIG. 8 illustrates an operation of obtaining information on dense area discovery resources through a peripheral device installed in a permanent dense area according to various embodiments of the present disclosure.

FIG. 8 illustrates an operation of obtaining information on the dense area discovery resources through a peripheral device installed in the permanent dense area according to various embodiments of the present disclosure.

In FIG. 8, an auxiliary device 808 is installed at the entrance of the permanent dense area 810, and the user device 802 moves to the permanent dense area 810 (see 804). During the movement, the user device 802 receives information on discovery resources for the permanent dense area 810 that is transmitted by the auxiliary device 808 at the entrance of the permanent dense area 810 in operation 806. The auxiliary device 808 is configured to detect the entry of the user device 802 into a predetermined area, and to transmit the information on discovery resources for the permanent dense area 810. According to various embodiments of the present disclosure, the user device 802 recognizes its own entry into the permanent dense area 810, and then makes a request to the auxiliary device 808 for the information on discovery resources for the permanent dense area 810.

Figure 9:
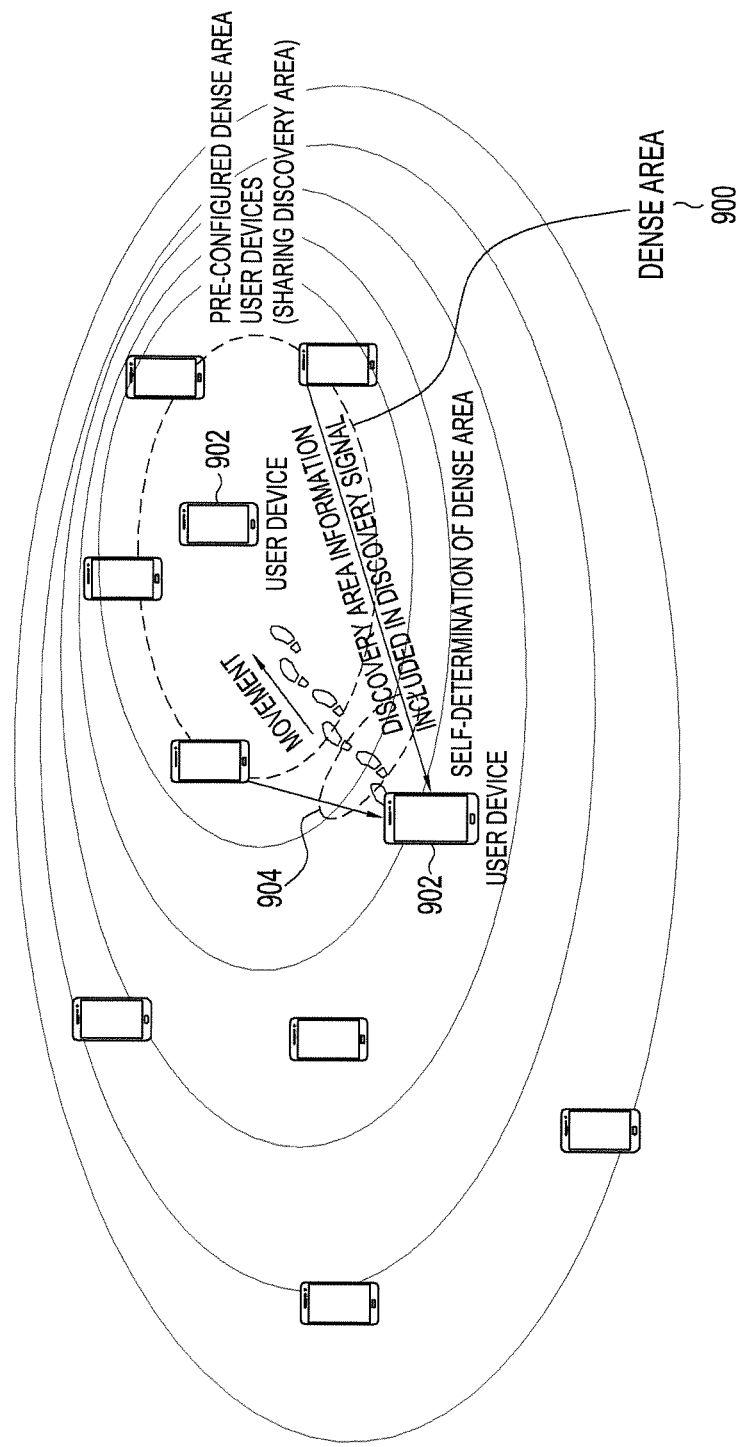
FIG. 9 illustrates an operation of obtaining information on dense area discovery resources in a dense area other than a permanent dense area according to various embodiments of the present disclosure.

FIG. 9 illustrates an operation of obtaining information on dense area discovery resources in a dense area other than the permanent dense area according to various embodiments of the present disclosure.

In FIG. 9, a user device 902 moves to a dense area 900, and other user devices located in the dense area 900 have selected DRBs for the discovery signals from the dense area discovery resources that are determined by the resource portioning method according to the present disclosure.

If the discovery signals transmitted by the user devices located in the dense area 900 include information on resources that are selected from among the discovery resources for the dense area 900, the user device 902 obtains the selectable resource information through the discovery signal of at least one of other user devices located in the dense area 900 in operation 904. In certain embodiments, the user device obtains the selectable resource information included in the discovery signals of other user devices, whereas overhead occurs due to transmission of the discovery signals including the selectable resource information by the user devices in the dense area.

In certain embodiments, other user devices located in the dense area 900 transmit the discovery signals do not include the selectable resource information. In certain embodiments, the counterpart user device 902 estimates the selectable resources of the entire discovery resources based on power of the discovery signals received from other user devices.

The user device 902 obtains the selectable resource information from the discovery signals of other user devices or selects the DRB for its own discovery signal from among the selectable resources, based on the estimated selectable resource information. If the user device 902 should repeatedly transmit the discovery signal, the DRB is selected at random or using a predetermined pattern such as a Latin square from among the selectable resources. According to certain embodiments of the present disclosure, in the dense area resource partition, the DRB is selected in three ways as shown in FIGS. 10A to 10C, according to the operation of the user device and the installation of the peripheral device.

Figure 10A:
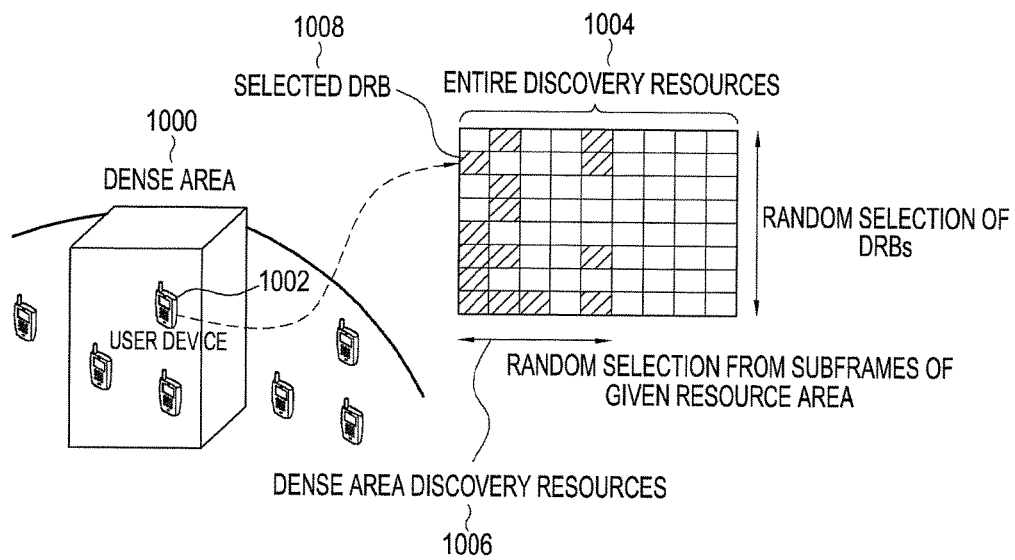
FIG. 10A illustrates a method for randomly selecting a discovery resource block (DRB) of a user device from among dense area discovery resources according to various embodiments of the present disclosure.

FIG. 10A illustrates an example of a method for randomly selecting the DRB of a user device from among dense area discovery resources according to various embodiments of the present disclosure. Hereinafter, for convenience of explanation, a user device 1002 in FIGS. 10A to 10C has recognized that its own position belongs to a dense area 1000 and the user device 1002 corresponds to the user device 902 of FIG. 9, which obtains the selectable resource information with respect to the dense area 1000. The selected DRBs from among the DRBs constituting the dense area discovery resources 1006 in the entire discovery resources 1004 are dotted and hatched.

Referring to FIG. 10A, the user device 1002 randomly selects one DRB 1008 from among the selectable DRBs of the DRBs constituting the discovery resources 1006 for the dense area 1000 where the user device 1002 is located based on selectable resource area information.

Figure 10B:
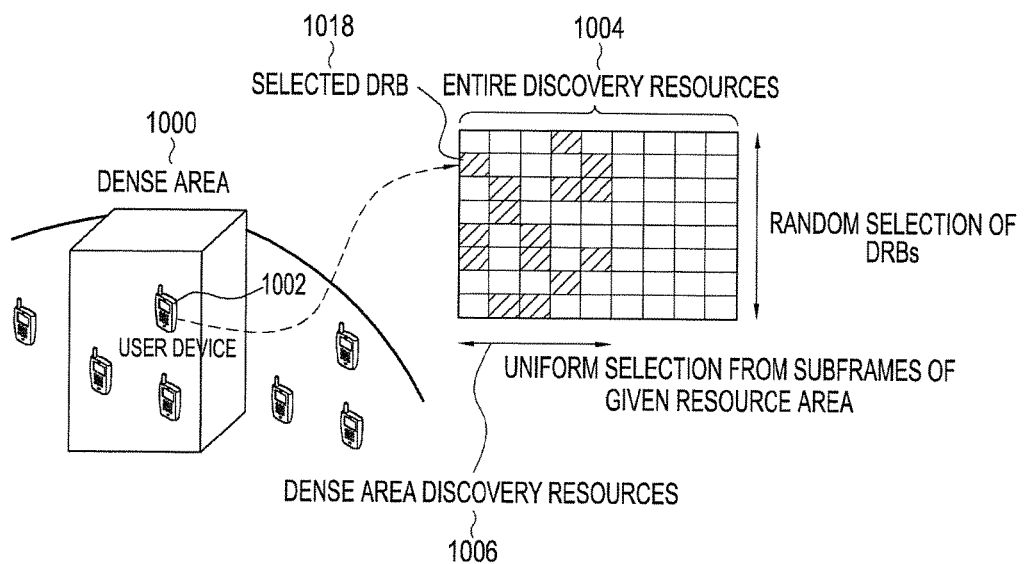
FIG. 10B illustrates an example of a method for selecting a DRB of a user device from among dense area discovery resources according to various embodiments of the present disclosure.
Figure 10C:
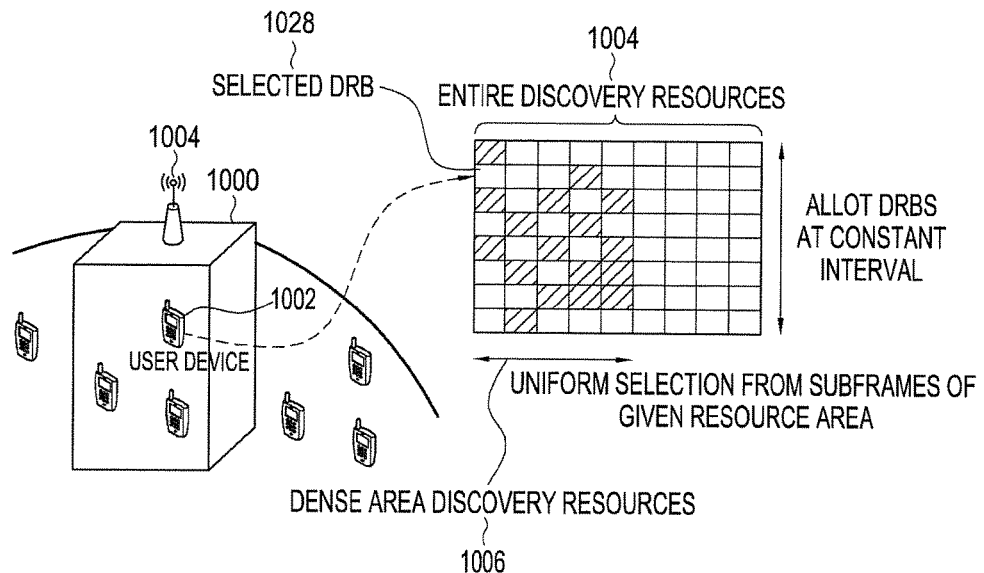
FIG. 10C illustrates an example of a method for selecting a DRB of a user device from among dense area discovery resources according to certain embodiments of the present disclosure.

FIG. 10B illustrates another example of a method for selecting the DRB of the user device from among dense area discovery resources according to various embodiments of the present disclosure.

Since the IBE interference set forth above influences other DRBs constituting the same subframe of a corresponding signal, the DRBs is uniformly selected by each subframe in order to reduce the IBE interference. In certain embodiments, the user device 1002 of FIG. 10b identifies DRB information selected by the user device from the discovery signals of other user devices located in the dense area 1000. The user device 1002 measures power of each subframe constituting the discovery resource 1006 for the dense area 1000. The user device 1002 randomly selects one DRB 1018 from the subframe having the lowest power. The uniform DRBs, such as the three DRBs by each subframe constituting the dense area discovery resources 1006, are selected.

FIG. 10C illustrates still another example of a method for selecting DRBs of a user device in dense area discovery resources according to various embodiments of the present disclosure. In certain embodiments, a peripheral device 1004 is installed to manage the dense area 1000 and minimize the IBE interference. The IBE interference is severe in the DRB closer to the DRB transmitting the discovery signal of the user device. In certain embodiments, the peripheral device 1004 allots the DRBs of the user devices located in the dense area 1000 to be distributed. According to certain embodiments, the peripheral device 1004 has recognized the DRB use status of each user device in the discovery resources 1006 for the dense area 1000. If a request for allotting the DRBs is received from the user device 1002, the peripheral device 1004 selects the DRB 1028 spaced a constant distance from the subframes and the subcarriers of the DRBs, which have been allotted to other user devices, from among the available DRBs of the discovery resources 1006 for the dense area 1000 in the entire discovery resources 1004.

In certain embodiments of the present disclosure, the DRBs for the discovery signals of the external user devices is allotted to the remaining area except for the dense area discovery resources in the entire discovery resources.

Figure 11:
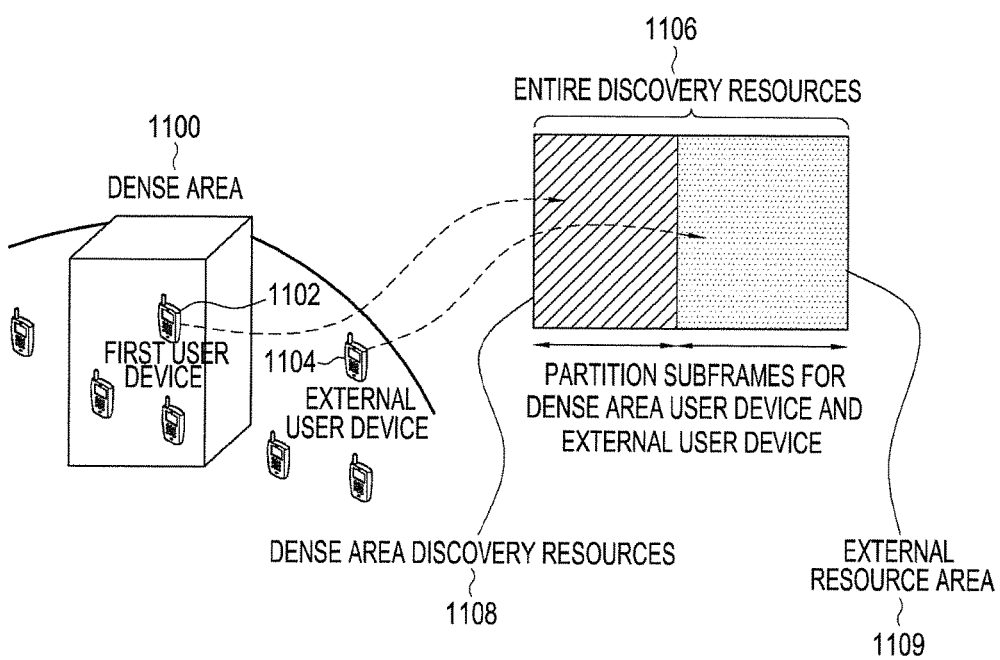
FIG. 11 illustrates an example of a resource partitioning method for an external area according to various embodiments of the present disclosure.

FIG. 11 illustrates an example of a resource partitioning method for an external area according to various embodiments of the present disclosure.

Referring to FIG. 11, the first user device 1102 located in a dense area 1100 selects one of the DRBs constituting a discovery resource area 1108 for the dense area in the entire discovery resources 1106. A user device located outside the dense area 1100, such as an external user device 1104, selects one of the DRBs constituting the remaining area (hereinafter, referred to as an "external resource area" 1109), except for the discovery resource area 1108, for the dense area in the entire discovery resources 1106. In certain embodiments, the resources are exclusively allotted to the user devices located in the dense area and the external user devices, respectively, through the resource allotment.

In certain embodiments, the external user device 1104 obtains information on the external resource area 1109. If the external user device 1104 escapes from the dense area 1100, the user device selects the DRB for the discovery signal from the remaining area except for the dense area discovery resources 1108 that are preliminary obtained in the entire discovery resources 1106. In certain embodiments, a base station serving the escaped external user device 1104 allots a DRB-selectable area of the external user device 1104, and the external user device 1104 having received the information selects the DRB for the discovery signal in the DRB-selectable area corresponding to the information.

Certain embodiments of the present disclosure implement various DRB selection methods by a combination of the DRB selection method of the user device located in the dense area described in FIGS. 10A to 10C and the resource partitioning method of the external user device described in FIG. 11.

Figure 12:
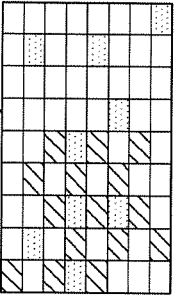
FIG. 12 illustrates examples of a DRB selection method according to various embodiments of the present disclosure.

FIG. 12 illustrates examples of a DRB selection method according to various embodiments of the present disclosure.

In certain embodiments, with regard to the DRB selection method, one of three DRB allotment methods are selected according to a condition requested by the user device located in the dense area, and the external user devices are divided into two types according to separation from the dense area discovery resources. In certain embodiments, the DRB selection method is described by six cases as shown in FIG. 12.

The DRB selection method of the user device located in the dense area are separated by the following criteria. First, if the minimum condition of additional overhead is required and the additional operation of the user device is not required, without considering the peripheral device, in selecting the DRB of the user device located in the dense area, if the user device located in the dense area selects the DRB from among the DRBs constituting the dense area discovery resources. Second, if the overhead and delay due to the additional operation of the user device is allowed or the interference with the user device located in the dense area exceeds a predetermined threshold in selecting the DRB of the user device located in the dense area, if the user device located in the dense area collects power of the subframes constituting the dense area discovery resources. One of the DRBs constituting the subframe with the lowest power is selected. Third, if adopting the peripheral device for managing the dense area, the peripheral device manages information on the DRBs allotted to the user devices located in the dense area. If a new user device enters the dense area, the peripheral device selects the DRB for the new user device from the DRBs constituting the available resources in the dense area discovery resources by a subframe unit and a subcarrier unit so that the selected DRB has a uniform interval from the pre-allotted DRBs.

If the external user device located outside the dense area, the DRB is selected according to the resource partitioning method by which the DRB is selected from the remaining area except for the dense area discovery resources or the method by which the DRB of the external user device is selected regardless of the dense area discovery resources.

Based on the criteria above, referring to FIG. 12, the method #1 (1200) refers to a method by which the DRB of the user device located in the dense area is selected according to the first criterion and the DRB of the external user device is selected without applying the resource partitioning method. The method #2 (1204) refers to a method by which the DRB of the user device in the external area is selected in the same manner as that of the method #1 and the DRB of the user device in the dense area is selected according to the second criterion above. The method #3 (1206) refers to a method by which the DRB of the user device in the dense area is selected according to the third criterion and the DRB of the external user device is selected without applying the resource partitioning method.

The method #4 (1208) refers to a method by which the DRB of the user device in the dense area is selected according to the first criterion and the DRB of the external user device is selected by applying the resource partitioning method. The method #5 (1210) refers to a method by which the DRB of the user device in the dense area is selected according to the second criterion and the DRB of the external user device is selected by applying the resource partitioning method. The method #6 (1212) refers to a method by which the DRB of the user device in the dense area is selected according to the third criterion and the DRB of the external user device is selected by applying the resource partitioning method.

Figure 13:
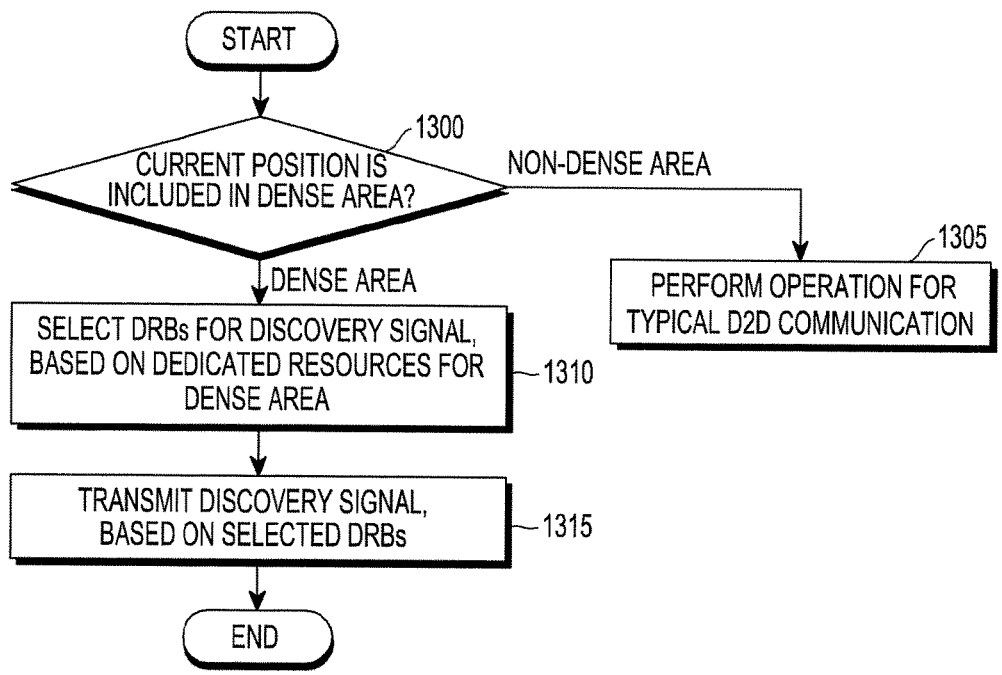
FIG. 13 illustrates the operation of a user device according to various embodiments of the present disclosure.

FIG. 13 illustrates the operation of a user device according to certain embodiments of the present disclosure.

In step 1300, the user device for D2D communication determines whether its own current position belongs to the dense area. This step is performed according to the criterion for dense area determination described above. The criterion for dense area determination has already been described before, so the detailed description thereof will be omitted here. In step 1305, if the current position of the user device does not belong to the dense area as the result of the determination in step 1300, the user device performs a typical operation for D2D communication.

In step 1310, if the current position of the user device belongs to the dense area as the result of the determination, the user device selects the DRB for the discovery signal, based on the resources dedicated for the dense area. The resources dedicated for the dense area is selected using any one of six methods shown in FIG. 12. In step 1315, the user device transmits the discovery signal using the selected DRB.

Figure 14:
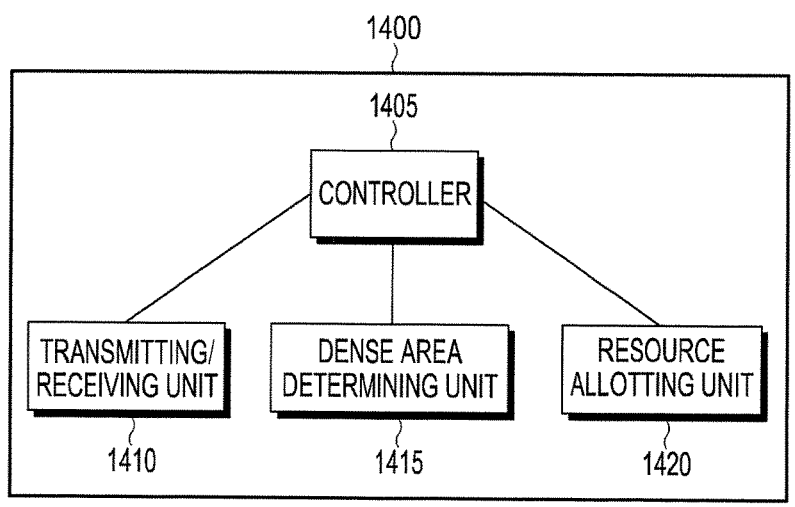
FIG. 14 illustrates a user device according to various embodiments of the present disclosure.

FIG. 14 illustrates a user device according to various embodiments of the present disclosure.

Referring to FIG. 14, the user device 1400 includes a controller 1405, a transmitting/receiving unit 1410, a dense area determining unit 1415, and a resource allotting unit 1420. The sub-units of the user device 1400 are only examples for convenience of explanation and can be combined as one unit or divided into sub-units for detailed operations according to certain embodiments or the desire of service providers.

The dense area determining unit 1415 determines whether the current position of the user device 1400 belongs to the dense area, according to the criterion for dense area determination set forth above. If the user device 1400 is determined to be located in the dense area, the resource allotting unit 1420 selects the DRB for the discovery signal in one of six DRB selection methods shown in FIG. 12 based on the resources dedicated for the dense area. The transmitting/receiving unit 1410 transmits the discovery signal using the selected DRB.

Figure 15:
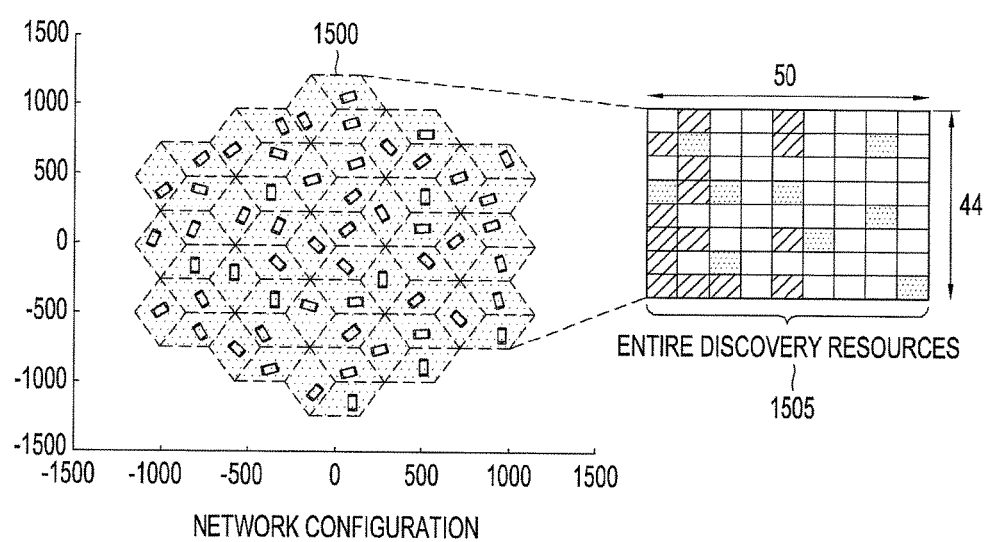
FIG. 15 illustrates an example of a network environment to which a resource partition is applied according to various embodiments of the present disclosure.

FIG. 15 illustrates an example of a network environment to which resource partition is applied according to various embodiments of the present disclosure.

In certain embodiments, the network environment follows 2-Tier Network Option 1 that has been decided in the 3rd Generation Partnership Project Radio Access Network (3GPP RAN)-1 conference. Referring to FIG. 15, in the cell configuration 1500, an inter-site distance between base stations installed in each cell is 500 meters and each cell includes three sectors. A building, which is 120 meters long and 50 meters wide, is randomly located in each cell. For example, 150 user devices are disposed in each sector, wherein 100 user devices are located in the dense area. In addition, 20 user devices and 30 user devices are located inside and outside the cars and small buildings (hereinafter, referred to as "virtual indoor places"), respectively. For example, the dense area discovery resources 1505 (time–frequency) for the discovery signal are comprised of $N_F \times N_T = 44 \times 50 = 2,200$ DRBs. $N_F$ denotes the number of partial blocks of frequency resources, and $N_T$ denotes the number of partial blocks of time resources. Based on the network environment and the dense area discovery resources, the user device, according to certain embodiments of the present disclosure, selects the DRB for transmitting the discovery signal in any one of six methods described in FIG. 12 according to its own position with respect to the dense area. In certain embodiments, in evaluating performance about repetition of a discovery section for D2D communication, DRB hopping is randomly made with respect to each rule.

Figure 16:
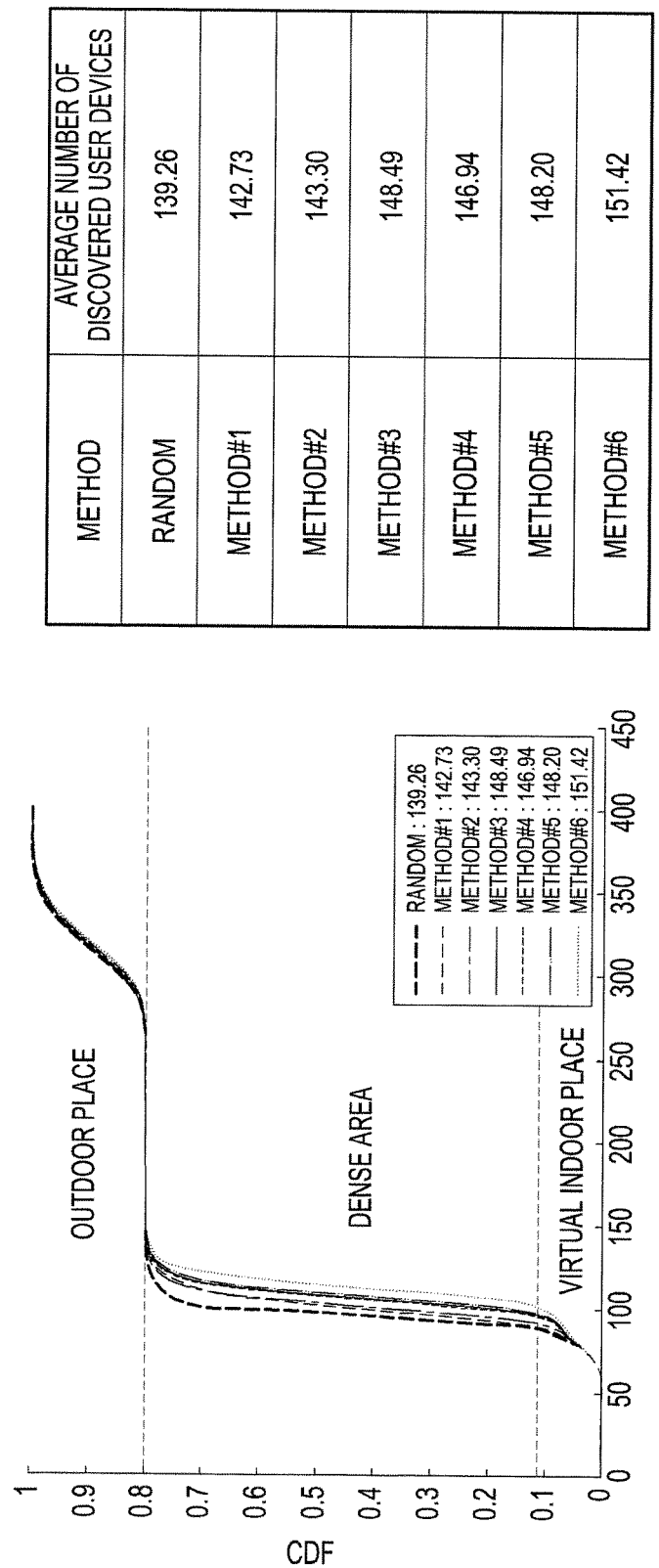
FIG. 16 illustrates the performance result if a resource partition is applied to a single discovery section according to various embodiments of the present disclosure.

FIG. 16 illustrates the performance result if resource partition is applied to a single discovery section according to certain embodiments of the present disclosure. In certain embodiments, the performance result is based on the network environment of FIG. 15.

Referring to FIG. 16, the X-axis shows the number of user devices discovered by the main user device, and the Y-axis shows the probability of discovering the number of user devices discovered as a cumulative distribution function (CDF). The performance result graph shows the results of a virtual indoor place, a dense area, and an outdoor place, respectively. In certain embodiments, if the resource partition is applied, the performance of the user devices in the dense area is considerably enhanced. If the resource not selected by the user device of the dense area is used in the outdoor place, the discovery performance improves due to a decrease in interference. The average number of discovered user devices by the main user device is lowest in the methods, shown in FIG. 12, not applying the resource partition. Of the methods shown in FIG. 12 where the resource partition is applied, the average number of discovered user devices is highest in method #6.

Figure 17:
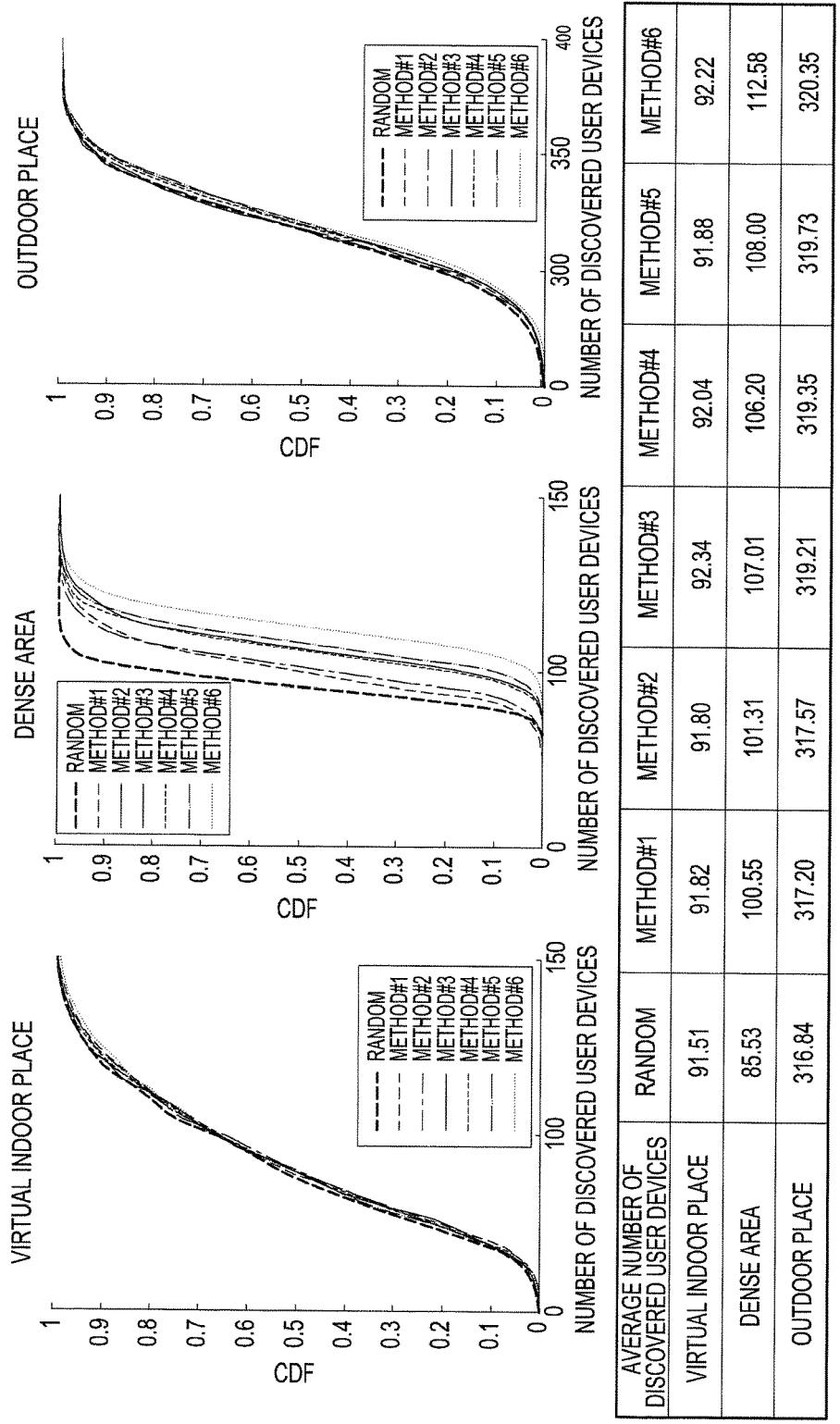
FIG. 17 illustrates the performance result of each area where a resource partition is applied according to various embodiments of the present disclosure.

FIG. 17 illustrates the performance result by each area where resource partition is applied according to various embodiments of the present disclosure.

Referring to FIG. 17, if the resource partition is performed, the performance of the user device located in the dense area is noticeably improved compared to the performance of the user device located in the outdoor place or in the virtual indoor place.

Figure 18:
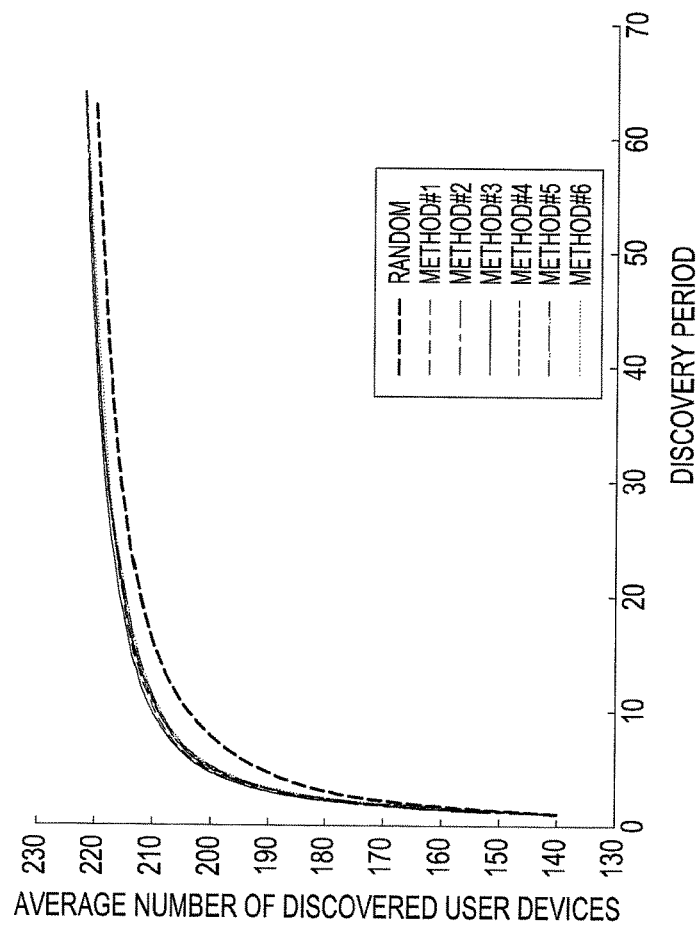
FIG. 18 illustrates the performance result if a resource partition is applied to a repetition discovery section according to various embodiments of the present disclosure.

FIG. 18 illustrates the performance result if resource partition is applied to a repetition discovery section according to certain embodiments of the present disclosure.

FIG. 18 shows the result of measuring the number of discovered user devices, which are accumulated in each discovery section. In certain embodiments, the average number of discovered user devices in the methods #1 to #6 is more than that of the random method that does not adopt the resource partition. The performance sharply increases at initial repetition of the discovery section (the first period), and, after repetition, the average number of discovered user devices remains constant after the 64th period in each method. The method #6 exhibits the highest performance in a single discovery section, whereas there is little or no difference between the methods #1 to #6 according to the embodiment of the present disclosure in the repetition discovery sections. In the repetition discovery sections, even without using complicated methods, such as a perfect resource partition, selection of the DRB having a uniform interval by a subframe unit and a subcarrier unit, or the like, the performance is enhanced only by randomly selecting the DRB in the dense area discovery resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling interference for device to device (D2D) communication by a mobile device, the method comprising:
receiving, from at least one neighbor device, discovery signals;
determining whether the mobile device is located in a first interference area based on power levels of the discovery signals or based on information indicating the first interference area, the information being included in the discovery signals; and
in determining that the mobile device is located in the first interference area based on a number of power levels among a plurality of power levels that are equal to or more than a power level threshold, obtaining first information related to dedicated resources of the first interference area and determining the dedicated resources of the first interference area among available resources allocated to discovery for D2D communication,
wherein the first information includes a ratio of the dedicated resources to the available resources.

2. The method of claim 1, wherein the number of the power levels is equal to or more than a predetermined value.

3. The method of claim 2, wherein the power level threshold is determined based on one of a power level accumulation value of previously received discovery signals and a power noise (PN) level.

4. The method of claim 1, wherein the first information further includes at least one of a position of a subframe and a position of a subcarrier, by which the dedicated resources start in the available resources.

5. The method of claim 1, wherein determining the dedicated resources comprises randomly selecting partial resources from among the partial resources constituting the dedicated resources.

6. The method of claim 1, wherein determining the dedicated resources comprises selecting partial resources from among the dedicated resources so that the partial resources are uniformly allocated by a time unit.

7. The method of claim 1, wherein determining the dedicated resources comprises selecting partial resources from among the dedicated resources so that the partial resources have constant intervals by a time unit and by a frequency unit from partial resources that have been allocated to other devices.

8. The method of claim 1, wherein determining the dedicated resources comprises allocating remaining resources except for the dedicated resources among the available resources as discovery resources for D2D communication by an external device located at outside of the first interference area.

9. A mobile device for controlling interference for device to device (D2D) communication, the mobile device comprising:
a transceiver configured to receive signals from neighbor devices; and
a controller configured to:
receive, from at least one neighbor device, discovery signals;
determine whether the mobile device is located in a first interference area based on power levels of the discovery signals or based on information indicating the first interference area, the information being included in the discovery signal; and
in determining that the mobile device is located in the first interference area based on a number of power levels among a plurality of power levels that are equal to or more than a power level threshold, obtain first information related to dedicated resources of the first interference area and determine the dedicated resources of the first interference area among available resources allocated to discovery for the D2D communication;
wherein the first information includes a ratio of the dedicated resources to the available resources.

10. The mobile device of claim 9, wherein the number of the power levels is equal to or more than a predetermined value.

11. The mobile device of claim 10, wherein the power level threshold is determined based on one of a power level accumulation value of previously received discovery signals and a power noise (PN) level.

12. The mobile device of claim 9, wherein the first information further includes at least one of a position of a subframe and a position of a subcarrier, by which the dedicated resources start in the available resources.

13. The mobile device of claim 9, wherein the controller is further configured to randomly select partial resources from among the dedicated resources.

14. The mobile device of claim 9, wherein the controller is further configured to uniformly select partial resources from among the dedicated resources so that the partial resources are allocated by a time unit.

15. The mobile device of claim 9, wherein the controller is further configured to select partial resources from among the dedicated resources so that the partial resources have constant intervals by a time unit and by a frequency unit from partial resources that have been allocated to other devices.

16. The mobile device of claim 9, wherein the controller is further configured to allocate remaining resources except for the dedicated resources among the available resources as discovery resources for D2D communication by an external device located at outside of the first interference area.

17. The method of claim 1, wherein obtaining first information related to the dedicated resources of the first interference area includes detecting in-band emission interference due to discovery signals of other devices.

18. The mobile device of claim 9, wherein the controller is further configured to detect in-band emission interference due to discovery signals of other devices.

19. The method of claim 1, wherein the dedicated resources for the first interference area are not same as dedicated resources of a second interference area.

20. The mobile device of claim 9, wherein the dedicated resources for the first interference area are not same as dedicated resources of a second interference area.

* * * * *